United States Patent
Fuccio

(10) Patent No.: US 10,639,705 B2
(45) Date of Patent: May 5, 2020

(54) COMBINED TECHNOLOGY INVESTMENT CASTING PROCESS

(71) Applicant: FISHER CONTROLS INTERNATIONAL LLC, Marshalltown, IA (US)

(72) Inventor: Sam T. Fuccio, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 0 days.

(21) Appl. No.: 15/390,082

(22) Filed: Dec. 23, 2016

(65) Prior Publication Data

US 2018/0178272 A1 Jun. 28, 2018

(51) Int. Cl.
*B22C 9/04* (2006.01)
*B22C 7/02* (2006.01)
(Continued)

(52) U.S. Cl.
CPC .............. *B22C 9/04* (2013.01); *B22C 7/02* (2013.01); *B28B 1/001* (2013.01); *B29C 64/00* (2017.08); *B33Y 10/00* (2014.12); *B33Y 50/02* (2014.12); *B33Y 80/00* (2014.12); *B29L 2031/757* (2013.01)

(58) Field of Classification Search
CPC .. B22C 7/00; B22C 7/02; B22C 7/023; B22C 9/00; B22C 9/04; B22C 9/043; B22C 9/046; B22D 29/00; B22D 29/02
See application file for complete search history.

(56) References Cited

U.S. PATENT DOCUMENTS 4,682,643 A * 7/1987 Bernhardt ................. B22C 9/04
164/34
5,382,308 A * 1/1995 Bourell ................. B05C 19/008
156/272.8

(Continued)

FOREIGN PATENT DOCUMENTS

EP 1764170 A1 3/2007
GB 872643 A 7/1961
GB 2465181 A 5/2010

OTHER PUBLICATIONS

International Search Report for Application No. PCT/US2017/065761, dated Feb. 1, 2018.

(Continued)

*Primary Examiner* — Kevin P Kerns
*Assistant Examiner* — Steven S Ha
(74) *Attorney, Agent, or Firm* — Marshall, Gerstein & Borun LLP

(57) ABSTRACT

A method of fabricating a finished part includes generating or creating a master pattern using an additive manufacturing process, and the master pattern corresponds in shape to the finished part. A shell is created by applying one or more layers of one or more coating materials to the master pattern. The master pattern is then dissolved while the master pattern is in the shell to create a cavity in the shell that corresponds in shape to the finished part. A molten material is then poured into the cavity of the shell. The molten metal is allowed to cool and to harden and/or to reach a determined temperature such that the molten metal becomes the finished part. The shell is then removed from around the finished part.

18 Claims, 6 Drawing Sheets

(51) Int. Cl.
    *B29C 64/00*     (2017.01)
    *B33Y 10/00*     (2015.01)
    *B33Y 50/02*     (2015.01)
    *B33Y 80/00*     (2015.01)
    *B28B 1/00*     (2006.01)
    *B29L 31/00*     (2006.01)

(56) References Cited

U.S. PATENT DOCUMENTS

| | | | |
|---|---|---|---|
| 2007/0068649 A1 | 3/2007 | Verner et al. | |
| 2010/0006252 A1* | 1/2010 | Roby | B22C 7/02 |
| | | | 164/15 |
| 2011/0213482 A1* | 9/2011 | Saarela | A44C 27/00 |
| | | | 700/98 |

OTHER PUBLICATIONS

Written Opinion for Application No. PCT/2017/065761, dated Feb. 1, 2018.
Examination Report issued in GCC Patent Application No. 2017-34453, dated Jun. 30, 2019.

* cited by examiner

COMBINED TECHNOLOGY INVESTMENT CASTING PROCESS

FIELD OF THE DISCLOSURE

This disclosure relates generally to investment casting processes.

BACKGROUND

Parts, particularly parts including complex geometry, may be fabricated using an investment casting process. In a typical investment casting process, a master pattern is fabricated to correspond in shape (but not necessarily in dimensions) to a desired finished part, and the master pattern may be made of a durable material, such as aluminum. The master pattern may be stored in a facility that may be remote from or at the facility where the finished part is fabricated. When a part (or an assembly including the part) is ordered by a customer, a corresponding master pattern is located and used to build a mold (known as a master die) having a cavity that corresponds in shape to the master pattern. The master die may be made using any of several processes and materials, such as creating a silicone mold of the master pattern. Molten wax is poured into the cavity of the master die to make a wax pattern that corresponds in shape to the master pattern. The wax pattern is then treated to erase parting lines, flashing, and/or any other imperfections. A wax sprue—which defines a pathway for a molding material to enter a cavity of an investment mold—may then be coupled to the wax pattern.

The investment mold (also known as a shell) is next fabricated in a process called shelling, and the shell is typically made from a ceramic material and produced by repeating a series of steps—coating, stuccoing, and hardening—until a desired mold thickness is achieved. Coating involves dipping the wax pattern (and the sprue) into slurry of fine material to create a uniform surface coating. In the stuccoing process, coarse ceramic particles are applied over the fine material. After a desirable thickness has been achieved, the coatings are then allowed to cure in the hardening stage.

Once the shell has fully cured, it is turned upside-down and placed in a furnace or autoclave to melt out and/or vaporize the wax pattern. Most shell failures occur at this point because the wax used often has a thermal expansion coefficient that is much greater than the shell material surrounding it. Accordingly, as the wax is heated, it expands and introduces stresses to the shell. To minimize these stresses, the wax is heated as rapidly as possible so that outer wax surfaces can melt and drain quickly, making space for the rest of the wax to expand.

The shell may then be pre-heated and a molding material—typically a molten metal—may be poured into the cavity of the shell left by the melting of the sprue and wax pattern. The molten metal may be gravity poured or forced by applying positive air pressure or other forces into the sprue (and/or any other inlet) of the shell. The shell may then be placed into a tub filled with sand to cool. When the molten metal has hardened and reached a suitable temperature, the shell is then destroyed to reveal the finished part. The finished part may then be cleaned up to remove signs of the casting process (e.g., remove the sprue and/or grind out surface imperfections) and shipped to a further location for assembly or storage.

The finished part may be fabricated using any of several materials. Because each material may have a different coefficient of thermal expansion, a unique master pattern—each having a unique set of dimensions—may be required to correspond to each material used to fabricate the same metal part. For example, if a first metal material (having a first coefficient of thermal expansion) is used to fabricate a finished part having specified dimensions, a unique first master pattern must be used to create the corresponding wax pattern. However, if a second metal material (having a second coefficient of thermal expansion) is used to fabricate a finished part having the same specified dimensions as the finished part made from the first metal material, a unique second master pattern must be used to create that corresponding wax pattern. Accordingly, for each finished part that can be created out of different materials, two or more master patterns must be fabricated and stored. This system results in relatively high manufacturing costs and complicates the manufacturing process. In addition, creating the master wax mold adds significant time to the production of a finished part.

BRIEF SUMMARY OF THE DISCLOSURE

A method of fabricating a finished part includes generating or creating a master pattern using an additive manufacturing process, which is a process that builds three-dimensional objects by adding successive layers of material on a material. The master pattern corresponds or substantially corresponds in shape to the finished part, and the master pattern is created from a first material. The method also includes creating a shell of the master pattern by applying one or more layers of one or more coating materials to the master pattern, and the coating material is different than the first material. The method further includes dissolving the master pattern while the master pattern is in the shell to create a cavity in the shell that corresponds in shape to the finished part. The method also includes pouring a molten material into the cavity of the shell, the molten material being a second material that is different than the first material and the coating material. The method additionally includes allowing the molten metal to harden and/or to reach a determined temperature such that the molten metal becomes the finished part. The method then includes removing the shell from around the finished part.

DETAILED DESCRIPTION

Figure 1:
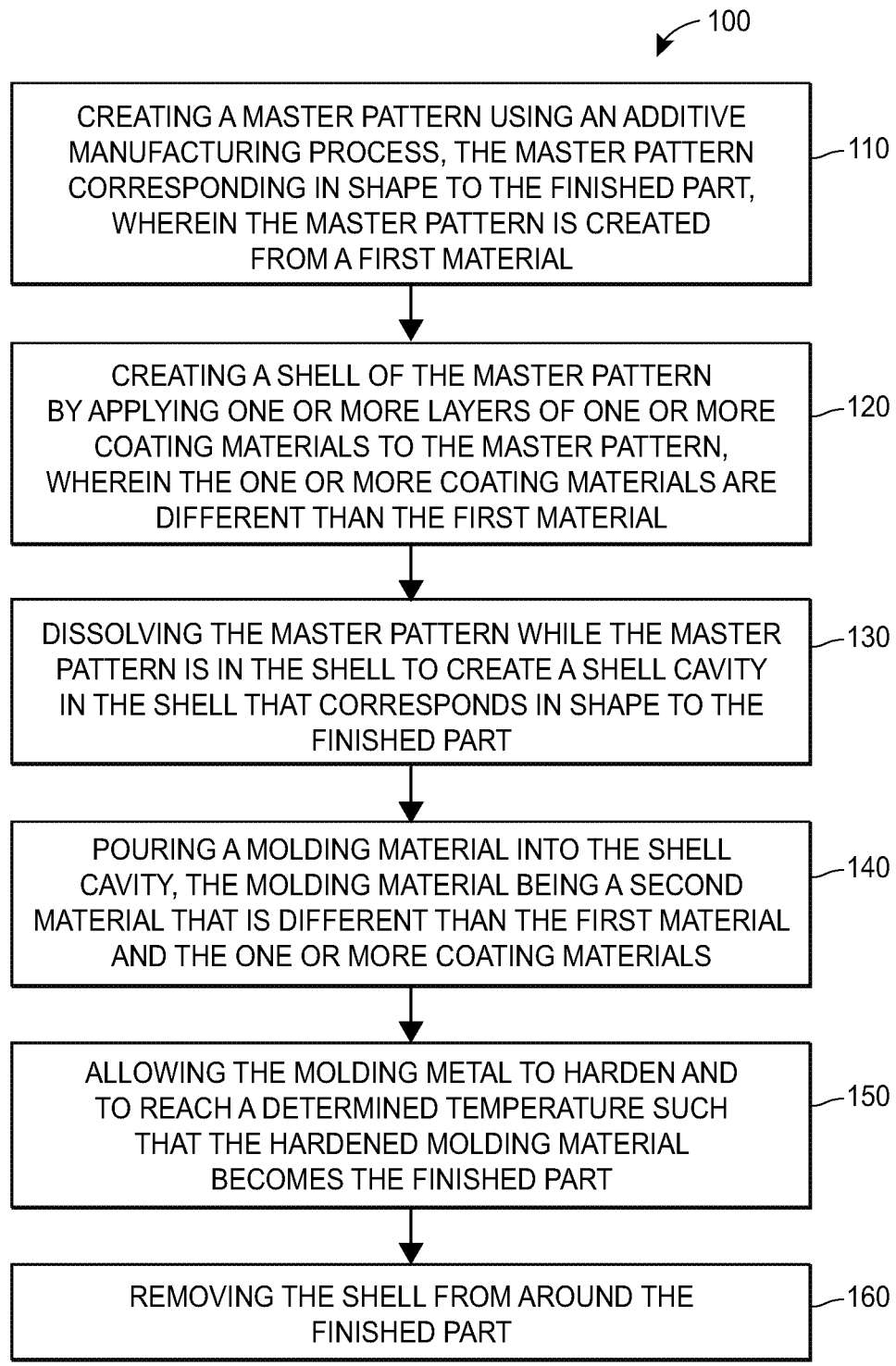
FIG. 1 is an illustration of an embodiment of a method of fabricating a finished part.

As illustrated in FIG. 1, a method 100 of fabricating a finished part includes, at 110, generating or creating a master pattern using an additive manufacturing process, which is a process that builds three-dimensional objects by adding successive layers of material on a material. The master pattern corresponds or substantially corresponds in shape to the finished part, and the master pattern is created from a first material. As illustrated at 120, the method 100 also includes creating a shell of the master pattern by applying one or more layers of one or more coating materials to the master pattern, and at least one of one or more coating materials is different than the first material. As indicated at 130, the method 100 further includes dissolving the master pattern while the master pattern is in the shell to create a shell cavity within the shell that corresponds in shape to the finished part. As indicated at 140, the method 100 also includes pouring a liquid material (e.g., a molten metal) into the shell cavity, the liquid material being a second material that is different than the first material and the one or more coating materials. The method 100 additionally includes allowing the liquid material to harden and/or to reach a determined temperature such that the liquid material becomes the finished part, as indicated at 150. As indicated at 160, the method 100 then includes removing the shell from around the finished part.

Figure 2:
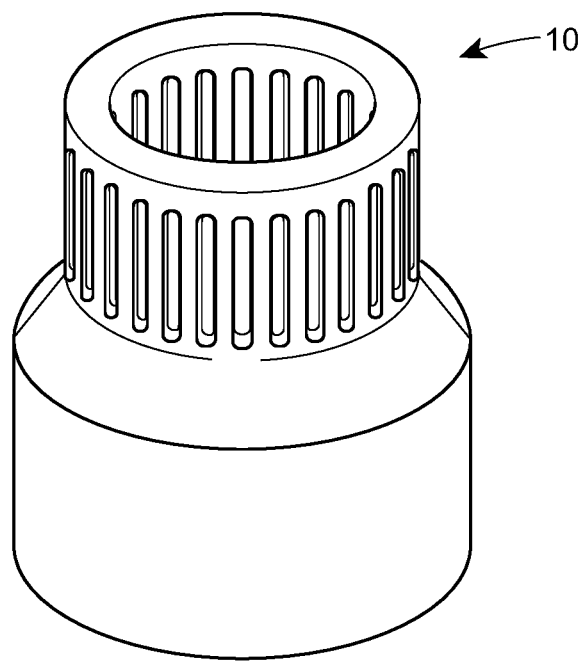
FIG. 2 is an embodiment of a master pattern fabricated using an additive manufacturing process.

As illustrated in FIG. 2, the master pattern 10, which corresponds (or generally corresponds) in shape to the finished part 12 (shown in FIG. 7) may be created using an additive manufacturing technique or additive manufacturing process. In some embodiments, the finished part 12 may be a part used in a valve assembly, such as a valve cage or valve plug. As previously explained, the additive manufacturing process may be any additive manufacturing process or technology that builds three-dimensional objects by adding successive layers of material on a material. The additive manufacturing process may be performed by any suitable machine or combination of machines.

The additive manufacturing process may include any of several processes, such as example only, a three-dimensional printing process, a stereolithography ("SLA") process, a fused deposition modeling ("FDM") process, multi-jet modeling ("MJM") process, and a selective laser sintering ("SLS") process. In some embodiments, the additive manufacturing process may include a laser powder bed fusion process. Any suitable first material can be used to form the master pattern 10, such as a plastic material or combination of plastic materials (e.g., nylon and/or polycarbonate). In some embodiments, two or more portions of the master pattern 10 may be fabricated using additive manufacturing processes, and the two or more portions of the master pattern 10 may be coupled to form the master pattern 10. The additive manufacturing process may include one or more machines that perform any of the processes described above, such as adding successive layers of liquid or powder material in a layer-upon-layer fashion to fabricate the master pattern 10.

The additive manufacturing process may typically involve or use a computer, three-dimensional modeling software (e.g., Computer Aided Design, or CAD, software), machine equipment, and layering material. In some embodiments, a CAD model (or virtual model) of the master pattern 10 is produced, and the one or more machine that performs that additive manufacturing process may read in data from the CAD file and layer or add successive layers of liquid, powder, sheet material (for example) in a layer-upon-layer fashion to fabricate the master pattern 10. As previously explained, the CAD model (and the master pattern 10 created from the CAD model) may have dimensions that are different than the finished part to account for material shrinkage during cooling.

Figure 3:
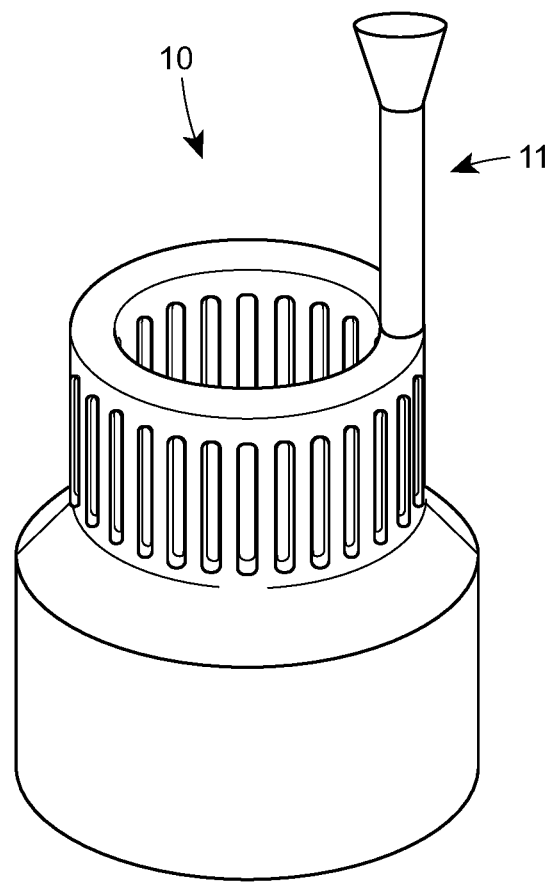
FIG. 3 is an embodiment of a master pattern having a sprue fabricated using an additive manufacturing process.

In some embodiments, a single master pattern 10 may be created and the single master pattern 10 may be shelled as described below. In such cases, and as illustrated in FIG. 3, a sprue 11 or pathway for a molding material to enter a shell 14 (see FIG. 3) may also be created using the CAD software such that when the master pattern 10 is created using the additive manufacturing process, the sprue 11 or pathway is also created. As would be understood by one having ordinary skill in the art, any number of sprues 11 or other pathways may be created, and the sprues 11 or other pathways may have any suitable shape or combination of shapes to allow a liquid material to be poured into a cavity formed by the shell after the master pattern 10 is dissolved as described in more detail below.

In some embodiments, multiple master patterns 10 (called a pattern cluster) may be created to be shelled as an assembly, and the master patterns may be linked by one or more sprues 11 or pathways that allow molding material to enter into each corresponding shell of the shell assembly during a batch pour of the molding material. The one or more sprues or pathways that link the mater patterns may also be created using the CAD software and additive manufacturing process.

Because only a CAD model is used to create the master pattern 10 whenever a master pattern 10 is needed, the labor intensive process of fabricating a metal master pattern, the master die, and the wax pattern are completely eliminated. In addition, maintaining an inventory of differently-sized physical master patterns for each potential fabrication material is not necessary, further reducing costs and lead times. In addition, small changes to the CAD model can be quickly and cheaply made without the time and expense of fabricating a new metal master pattern.

Figure 4:
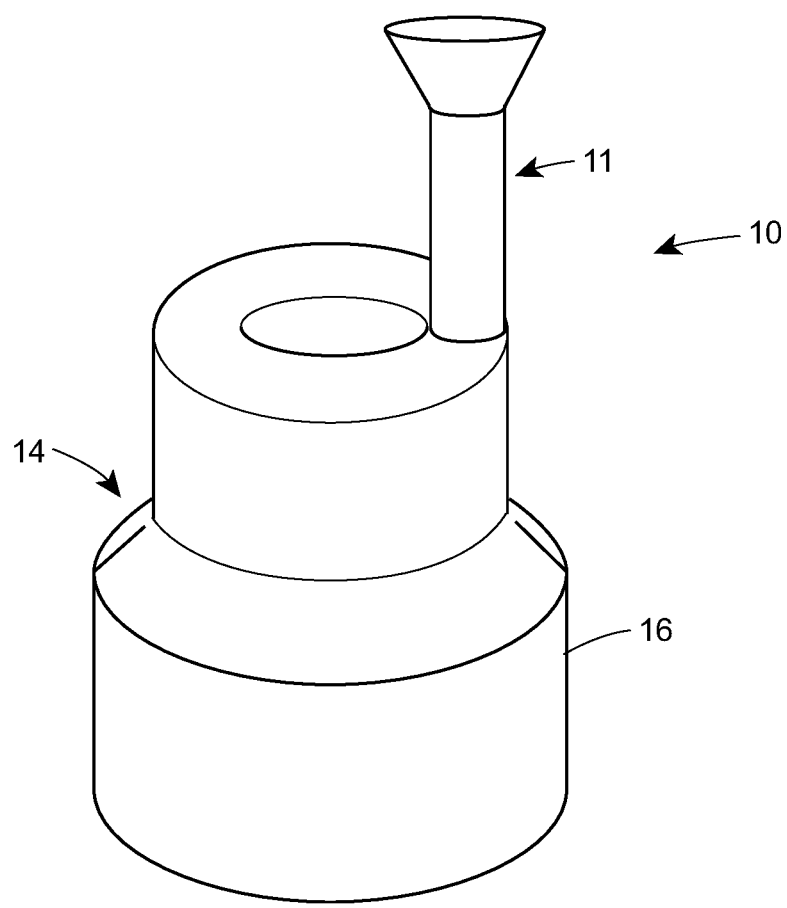
FIG. 4 is an embodiment of a shell formed around the embodiment of the master pattern of FIG. 3.

After the creation of the master pattern 10, the shell 14 of the master pattern 10 is created by applying one or more layers of one or more coating materials 16 to the master pattern, as illustrated in FIG. 4. In the shelling process, the coating material(s) 16 is different than the first material. As previously explained, the shell 14 may be made from a ceramic material (or materials) and produced by repeating a series of steps—coating, stuccoing, and hardening—until a desired mold thickness is achieved.

During the coating process (also called a "prime coat"), the master pattern 10 (and the attached sprue 11 or pathway) is dipped into slurry of fine refractory material to create a uniform surface coating. Common materials used for coating may include silica, zircon, various aluminum silicates, and alumina. Binders may be used to hold the refractory material in place, and such binders may include ethyl silicate, colloidal silica, sodium silicate, and a hybrid of these controlled for pH and viscosity. The fine refractory material preserves small details of the master pattern 10.

After the coating process, the stuccoing process may begin. In the stuccoing process, coarse ceramic materials may be applied to the master pattern 10 (and the fine refractory material(s)) in any suitable manner. For example, coarse ceramic materials may be applied to the master 10 (and the fine refractory material(s)) by dipping the master pattern 10 (and the fine refractory material(s)) into a fluidised bed, placing the master pattern 10 (and the fine refractory material(s)) in a rainfall-sander or by applying coarse materials by hand.

The coating process and the stuccoing process may be repeated until the shell reach its required thickness. The shell is then left to dry completely in the hardening stage, which can take 16 to 48 hours. Drying can be accelerated by applying a vacuum or minimizing environmental humidity.

Figure 5:
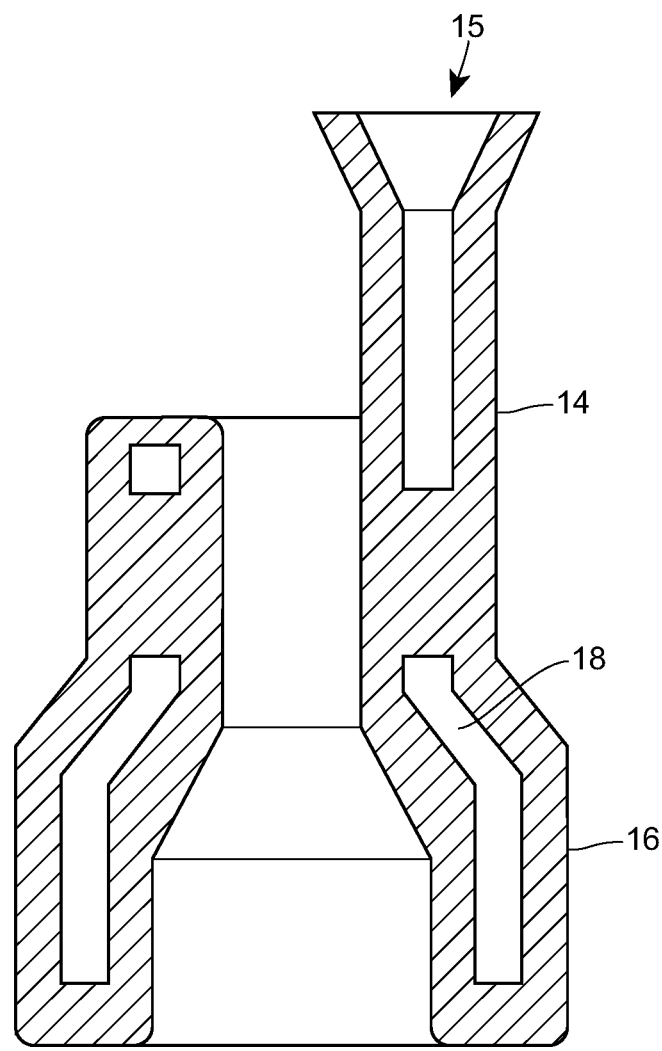
FIG. 5 is a cross-sectional view of the shell of FIG. 4 after the master pattern has been dissolved to form a shell cavity within the shell.

Once the shell 14 has fully cured, the master pattern 10 may be "removed" from the shell 14 to leave a shell cavity 18 that is illustrated in the cross-sectional view of the shell 14 in FIG. 5. The master pattern 10 can be removed from the shell 14 in any suitable manner that does not involve melting the master pattern 10 using an elevated temperature. For example, ultrasonic energy may be directed at the master pattern 10 such that the first material of the master pattern 10 dissolves or liquefies. Because the ultrasonic energy does not affect the one or more coating materials 16, the liquid first material may be poured out of the resulting shell cavity 18 from an opening 15 formed by the sprue 11 or pathway. In some embodiments, the master pattern 10 may be dissolved using an ultrasonic bath of liquid, such as a bath of water or (water and chemicals). In other embodiments, chemicals may be used to dissolve the master pattern 10 such that the first material of the master pattern 10 dissolves or liquefies.

One having ordinary skill in the art would recognize that removing the master pattern 10 without using elevated temperatures is advantageous. Specifically, as previously explained, typical wax master patterns w were melted out of the shell by using an autoclave to heat up the shell. Also as previously explained, the wax used often had a thermal expansion coefficient that is much greater than the shell material surrounding it, and as the expansion of the wax during heating introduces stresses to the shell. By eliminating the autoclave altogether, a significant cause of shell fractures is thereby eliminated, also making the process more time and cost efficient.

Figure 6:
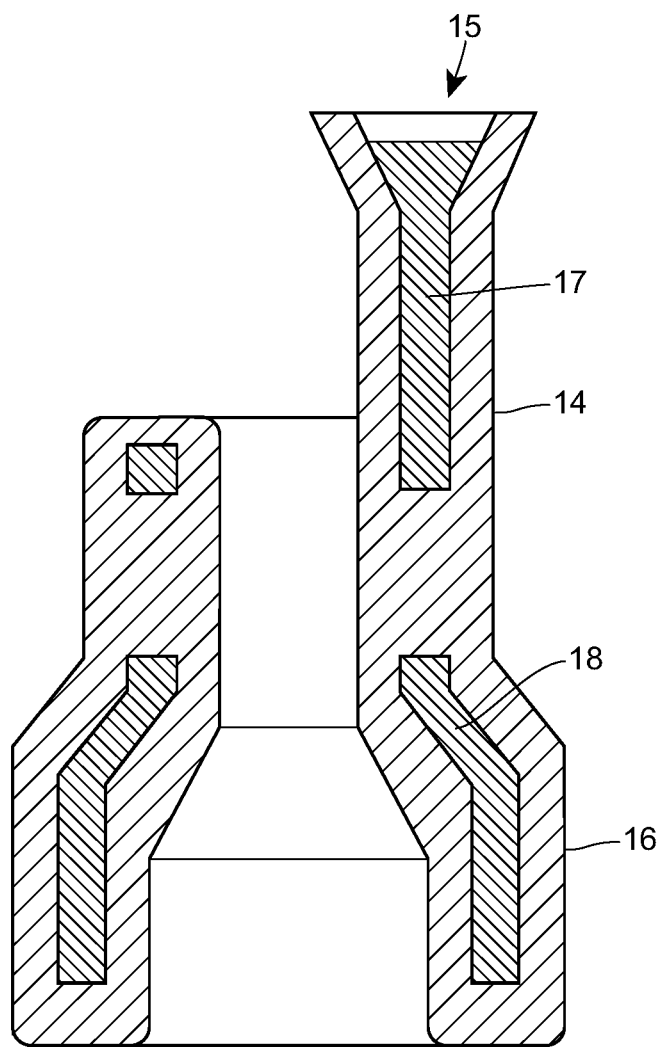
FIG. 6 is a cross-sectional view of the shell of FIG. 5 after molding material is poured into the shell cavity.

After the master pattern 10 is removed from the shell 14 to leave the shell cavity 18, the shell 14 may then be pre-heated. The molding material 17—typically a molten metal—may then be poured into the shell cavity 18 into the opening 15 created by the sprue 11 or pathway, as illustrated in FIG. 6. The molding material 17 may be a second material that is different than the first material of the master pattern 10 or the one or more coating material(s) 16 of the shell 14. The molding material 17 may be gravity poured or forced by applying positive air pressure or other forces into the opening 15 of the shell 14.

Figure 7:
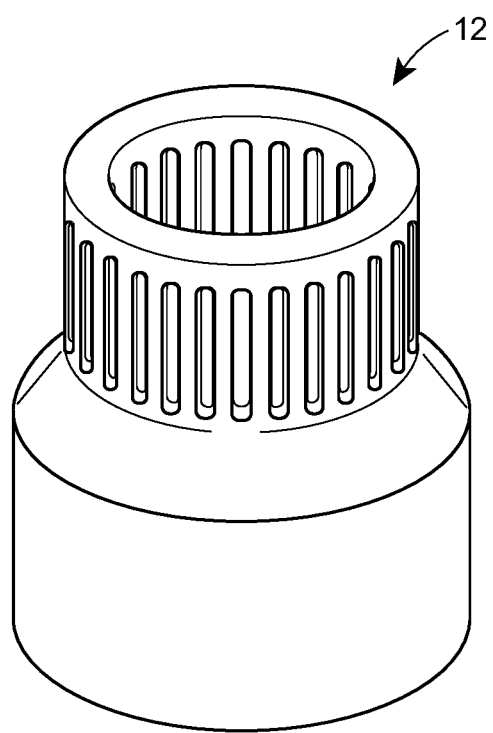
FIG. 7 is an embodiment of a finished part that corresponds in shape to the embodiment of the master pattern of FIG. 2.

The molding material 17 may then be allowed to harden and/or to reach a determined temperature such that the solid molding material 17 becomes or comprises the finished part 12 (illustrated in FIG. 7). In some embodiments, the shell 14 may be placed into a tub filled with sand to cool. When the molding material 17 has hardened and/or reached a suitable temperature, the shell 14 may then be removed from around the finished part 12. For example, the shell 14 may be hammered, media blasted, vibrated, waterjeted, or chemically dissolved to release the finished part. The finished part 12 may then be cleaned up to remove signs of the casting process (e.g., remove the sprue residue or grind out surface imperfections) as illustrated in FIG. 7. The finished part 12 may then be shipped to a location for assembly or storage.

While various embodiments have been described above, this disclosure is not intended to be limited thereto. Variations can be made to the disclosed embodiments that are still within the scope of the appended claims.

What is claimed is:

1. A method of fabricating a finished part, the method including:
    creating a master pattern using an additive manufacturing process, the master pattern corresponding in shape to the finished part, wherein the master pattern consists of one or more plastic materials;
    creating a shell of the master pattern by applying one or more layers of one or more coating materials to the master pattern, wherein the one or more coating materials is different than the one or more plastic materials;
    ultrasonically dissolving the master pattern while the master pattern is in the shell to create a shell cavity in the shell that corresponds in shape to the finished part;
    pouring a molding material into the shell cavity, the molding material being a material that is different than the one or more plastic materials and the one or more coating materials;
    allowing the molding material to harden and to reach a determined temperature such that the hardened molding material becomes the finished part; and
    removing the shell from around the finished part.

2. The method of claim 1, wherein ultrasonically dissolving the master pattern while the master pattern is in the shell comprises directing ultrasonic energy at the master pattern while the master pattern is in the shell.

3. The method of claim 1, wherein ultrasonically dissolving the master pattern while the master pattern is in the shell comprises ultrasonically dissolving the master pattern while the master pattern is in the shell in an ultrasonic bath of liquid.

4. The method of claim 1, wherein ultrasonically dissolving the master pattern while the master pattern is in the shell does not involve subjecting the shell to a temperature increase.

5. The method of claim 1, wherein the additive manufacturing process includes a machine that adds successive layers of liquid or powder material in a layer-upon-layer fashion to fabricate the master pattern.

6. The method of claim 5, wherein the additive manufacturing process is one of a three-dimensional printing process, a stereolithography process, a fused deposition modeling process, a multi-jet modeling process, and a selective laser sintering process.

7. The method of claim 5, wherein the machine uses a virtual model created using a Computer Aided Design program to fabricate the master pattern.

8. The method of claim 5, further comprising:
    using a Computer Aided Design program to create a virtual model of the master pattern, and the virtual model is used by the machine to fabricate the master pattern.

9. The method of claim 1, wherein the molding material is a molten metal.

10. The method of claim 1, wherein ultrasonically dissolving the master pattern while the master pattern is in the shell does not involve melting the master pattern using an elevated temperature.

11. A method of fabricating a finished part, the method including:
    creating a master pattern using an additive manufacturing process, the master pattern corresponding in shape to the finished part, wherein the master pattern is created from a first material;
    creating a shell of the master pattern by applying one or more layers of one or more coating materials to the master pattern, wherein the one or more coating materials is different than the first material;
    dissolving the master pattern with ultrasonic energy by using an ultrasonic bath of liquid by directing the ultrasonic energy at the master pattern while the master pattern is in the shell to create a shell cavity in the shell that corresponds in shape to the finished part;

pouring a molding material into the shell cavity, the molding material being a second material that is different than the first material and the one or more coating materials;

allowing the molding material to harden and to reach a determined temperature such that the hardened molding material becomes the finished part; and removing the shell from around the finished part.

12. The method of claim 11, wherein ultrasonically dissolving the master pattern while the master pattern is in the shell does not involve subjecting the shell to a temperature increase.

13. The method of claim 11, wherein the additive manufacturing process includes a machine that adds successive layers of liquid or powder material in a layer-upon-layer fashion to fabricate the master pattern.

14. The method of claim 13, wherein the additive manufacturing process is one of a three-dimensional printing process, a stereolithography process, a fused deposition modeling process, a multi-jet modeling process, and a selective laser sintering process.

15. The method of claim 13, wherein the machine uses a virtual model created using a Computer Aided Design program to fabricate the master pattern.

16. The method of claim 13, further comprising:

using a Computer Aided Design program to create a virtual model of the master pattern, and the virtual model is used by the machine to fabricate the master pattern.

17. The method of claim 11, wherein the molding material is a molten metal.

18. The method of claim 11, wherein ultrasonically dissolving the master pattern while the master pattern is in the shell does not involve melting the master pattern using an elevated temperature.

* * * * *

UNITED STATES PATENT AND TRADEMARK OFFICE
CERTIFICATE OF CORRECTION

PATENT NO. : 10,639,705 B2  
APPLICATION NO. : 15/390082  
DATED : May 5, 2020  
INVENTOR(S) : Sam T. Fuccio Page 1 of 1

It is certified that error appears in the above-identified patent and that said Letters Patent is hereby corrected as shown below:

In the Specification

At Column 4, Line 60, "master 10" should be -- master pattern 10 --.

At Column 4, Line 64, "rainfall-sander" should be -- rainfall-sander, --.

At Column 4, Line 67, "reach" should be -- reaches --.

At Column 5, Line 1, "dry" should be -- dry or cure --.

At Column 5, Line 25, "w were" should be -- were --.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*